United States Patent [19]

Kawamata et al.

[11] 4,096,015
[45] Jun. 20, 1978

[54] METHOD OF MAKING LAMINATED PLASTIC CARDS

[75] Inventors: Toshio Kawamata; Yutaka Inaba; Kuniyasu Shiroishi; Shigeru Morishita, all of Tokyo, Japan

[73] Assignee: Fuji Photo Film Co., Ltd., Minamiashigara, Japan

[21] Appl. No.: 704,402

[22] Filed: Jul. 12, 1976

[30] Foreign Application Priority Data

Jul. 18, 1975 Japan .................................. 50-88082

[51] Int. Cl.[2] ........................ B29C 27/04; B32B 31/20
[52] U.S. Cl. .................................... 156/273; 40/2.2; 156/277; 156/300; 156/309; 283/7; 428/916
[58] Field of Search ............... 156/273, 272, 298, 300, 156/309, 277; 40/2.2; 283/7; 428/67, 212, 217, 916

[56] References Cited

U.S. PATENT DOCUMENTS

| | | | |
|---|---|---|---|
| 2,364,870 | 12/1944 | Otto | 156/289 |
| 3,245,697 | 4/1966 | Nugent | 40/2.2 |
| 3,413,171 | 11/1968 | Hannon | 156/277 |
| 3,802,101 | 4/1974 | Scantlin | 40/2.2 |
| 3,870,344 | 3/1975 | Heller, Jr. et al. | 156/273 X |
| 3,930,924 | 1/1976 | Oka et al. | 283/7 X |

OTHER PUBLICATIONS

Castagna, E. G., High-Frequency Bonding: Part I, In Plastics Technology, vol. 10, pp. 32–36, Mar. 1964.

*Primary Examiner*—David Klein
*Assistant Examiner*—M. G. Wityshyn

[57] ABSTRACT

At least one thermoplastic sheet is interposed between a pair of transparent thermoplastic cover sheets with a photograph interposed between the cover sheet and the thermoplastic sheet. The sheet assembly together with the photograph is pressed between a pair of flat electrodes of a high-frequency dielectric heating device. Then, the assembly is subjected to high-frequency dielectric heating.

6 Claims, 5 Drawing Figures

METHOD OF MAKING LAMINATED PLASTIC CARDS

BACKGROUND OF THE INVENTION

1. Field of the Invention

This invention relates to a method of making plastic identification cards, and more particularly to a method of making laminated identification cards of hard plastic with a photograph, a magnetic recording tape or the like interposed between the layers thereof.

2. Description of the Prior Art

Laminated plastic cards for identification use such as credit cards, membership cards, identification cards, bank account cards etc. are mainly composed of a pair of transparent plastic sheets and a white opaque plastic sheet interposed therebetween bearing on the surface thereof printed information such as the title of the card, the issue date, the name of the person, the expiration date term etc.

This kind of plastic card should preferably have identification means such as a portrait of the owner of the card. There have been two popular methods of preparing this kind of laminated plastic card including a portrait interposed between the layers thereof. In one of these methods of lamination adhesives are applied to the surfaces of the plastic sheets to be laminated. In the other lamination is accomplished by fusing the surfaces of the plastic sheets by heat.

The method of lamination using adhesives is disadvantageous in that the manufacturing cost is raised by the adhesive applying process and in that the life of the cards is limited to the life of the adhesives. The method of lamination by heating and fusing the surfaces of the plastic sheets is disadvantageous in that a high heating temperature is needed. When the plastic sheets are too much heated, the surface of the plastic sheet bearing printed information is softened and the printed information is deformed.

In the above described conventional methods, the plastic sheets are heated by heating pressure plates which work to heat the surface of the laminated plastic sheets from outside. These external heating methods usually heat the surface of the plastic sheets up to about 100° C when adhesives are used and about 130° to 150° C when no adhesives are used. Therefore, it usually takes 30 to 60 minutes to complete the lamination. Thus as a practical matter, it is almost impossible by these methods to produce identification cards with a portrait interposed between the sheets thereof. If, in spite of the difficulties involved, a card with a potrait is prepared, the surface of the completed card is apt to swell in the area where the potrait is interposed. Further, it often happens that bubbles appear around the portrait interposed between layers of the laminated card.

SUMMARY OF THE INVENTION

In view of the above described defects inherent in the conventional method of making plastic cards, the primary object of the present invention is to provide a method of making plastic identification cards having a portrait or the like interposed between the layers thereof which does not use heating devices or adhesives and accordingly is capable of making cards in a short time and without deforming printed information borne thereby.

Another object of the present invention is to provide a method of making laminated plastic cards having a portrait or the like interposed between the layers thereof which does not cause the cards to be swelled in the area of the portrait.

Still another object of the present invention is to provide a method of making laminated plastic cards having a portrait or the like between the layers thereof which does not cause bubbles to appear around the portrait.

A further object of the present invention is to provide a method of making laminated plastic cards having a portrait or the like between the layers thereof which can be carried out with a compact device.

A still further object of the present invention is to provide a method of making laminated plastic cards having a portrait or the like between the layers thereof which is capable of making cards having long durability.

The method of making the laminated plastic cards in accordance with the present invention employs a high-frequency wave dielectric heating device in combination with pressure. In this method, at least one transparent plastic cover sheet and at least two other plastic sheets one or both of which may be opaque are laminated with a portrait or the like interposed between the transparent cover sheet and one of the other sheets. The plastic sheets together with the portrait are sandwiched between a pair of flat electrodes of a high-frequency wave dielectric heating device and pressed thereby. By the high-frequency dielectric heating, the sheets are heated from inside and accordingly the surfaces of the sheets in contact with each other are fused. Since the portrait is interposed between two of the sheets, the portrait is buried therein. The size of the portrait should be smaller than that of the plastic sheets, and the thickness of the portrait should be smaller than the total thickness of the plastic sheets. The plastic sheets are pressed by the pair of flat electrodes.

When three plastic sheets are used in the present method, the central sheet is most fused and the portrait is buried in the central sheet. Further, a part of the central sheet is pushed out to absorb the volume of the portrait paper or the like. Therefore, the surface of the central sheet is deformed. Accordingly, if the card is to bear print information, it is necessary to print such information on the surface of either the topmost sheet or the bottommost sheet. The sheet bearing such information must also be transparent.

In accordance with the inventors' tests, the portrait paper should preferably have a rough surface in order to completely prevent the generation of bubbles around or on the portrait paper.

In a preferred embodiment of the present invention, the central plastic sheet interposed between outer plastic sheets is made of a thermoplastic material which is more easily softened by high-frequency dielectric heating than the thermoplastic material used for the outer plastic sheets. In this embodiment, the central sheet is softened and fused much faster than the outer sheets, and accordingly, the time for making the card is further shortened. In addition, the printed surface apart from the central sheet is well protected.

DESCRIPTION OF THE PREFERRED EMBODIMENTS

Figure 1:
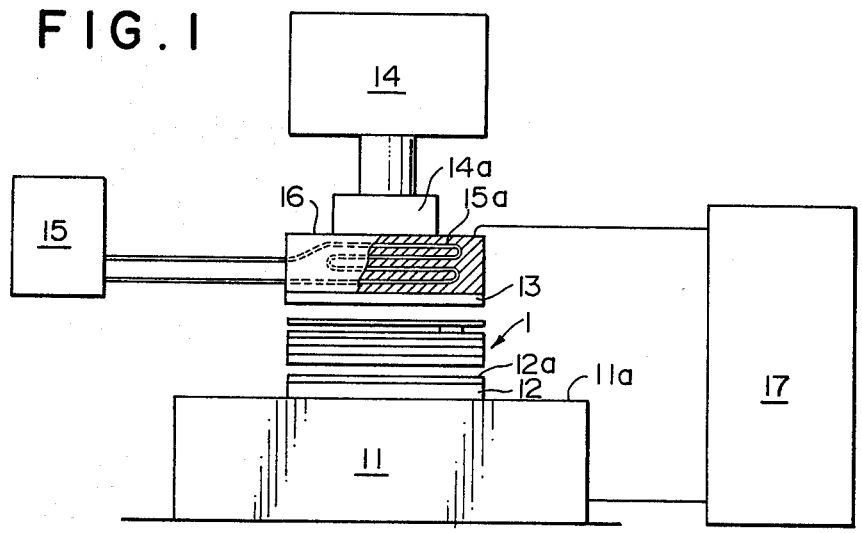
FIG. 1 is a side elevational view showing a high-frequency dielectric heating device used for carrying out the method in accordance with the present invention.

A high-frequency induction heating device used in the method of this invention is shown in FIG. 1. FIG. 1 shows a plastic card laminating apparatus employing a high-frequency dielectric heating device. The apparatus is composed of a base table 11 having a flat horizontal face 11a, a lower flat mold 12, a dielectric plate 12a having a mirror-finished surface placed on the lower flat mold 12, a pressure device 14 located above the base table 11 having a pressure member 14a made of an insulating material, an upper electrode 16 fixed to the pressure member 14a and having a cooling conduit 15a, an upper flat mold 13 fixed to the lower surface of the upper electrode 16, a cooling device 15 connected with the cooling conduit 15a provided in the upper electrode 16, and a high-frequency wave generator 17 connected with the upper electrode 16 and the base table 11. The lower surface of the upper flat mold 13 facing the lower flat mold 12 is mirror-finished and parallel to the mirror-finished surface of the dielectric plate 12a.

A plastic sheet assembly 1 to be made into a laminated plastic card is interposed between the upper flat mold 13 and the dielectric plate 12a. The dielectric plate 12a can be removed if not necessary, and is interchangeable with other dielectric plates of different thickness when desired. The dielectric plate 12a is used for positioning the sheet of the plastic sheet assembly 1 which is to be heated first so as to fall at the middle point between the upper flat mold 13 and the lower flat mold 12 (more exactly, between the lower surface of the upper electrode 16 and the upper surface of the base table 11). The thickness of the dielectric plate 12a is selected between 0.05 to 0.5mm, and is preferably less than 0.2 times as large as the thickness of the completed plastic card.

The pressure exerted by the pressure device 14 is selected between 1 to 50kg/cm$^2$. This order of pressure can be obtained by an oil pressure cylinder or the like. The cooling device 15 is not absolutely necessary. Without the cooling device, the laminated plastic card can be completed in several hundreds of seconds, which is considerably shorter than the time required in the conventional laminater. However, when the cooling device is used, the time is shortened up to several to several tens of seconds. The frequency of the high-frequency wave generator 17 is selected between 10 to 100MHz. The output power thereof is selected between 0.1 to 1.5kw/cm$^3$ with respect to the volume of the plastic card. The dielectric plate 12a is made of bakelite, glass, hard varnish cloth or the like.

The dielectric plate 12a placed on the lower flat mold 12 has a function not only to position the sheet of the plastic sheet assembly at a desirable position, but also to prevent the dielectric breakdown of the plastic sheet assembly interposed between the upper and lower flat molds 13 and 12 and to prevent the heat loss caused by the heat transfer from the plastic sheet assembly 1 to the lower flat mold 12 and the base table 11.

In accordance with the present invention, a plastic sheet assembly 1 comprising at least three thermoplastic sheets including at least one outer transparent plastic sheet and an identification member such as a portrait interposed between the outer transparent plastic sheet and another plastic sheet is sandwiched between the upper flat mold 13 and the dielectric plate 12a on the lower flat mold 12. Then, a pressure is applied to the plastic sheet assembly 1 by the pressure device 14. Thereafter, a high-frequency wave is generated by the generator 17 and applied to the plastic sheet assembly 1 by way of the upper electrode 16 and the base table 11. The upper electrode 16 is cooled by the cooling device 15. Consequently, a laminated plastic card having parallel front and back surfaces without any bubbles is produced.

Figure 2:
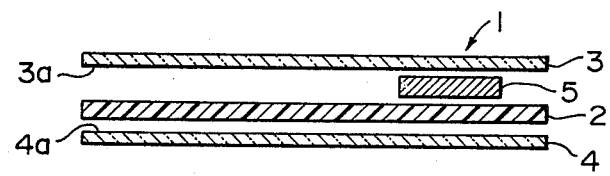
FIG. 2 is a sectional view showing an example of the plastic sheets to be laminated into the plastic card in accordance with the method in accordance with the present invention.
Figure 3:
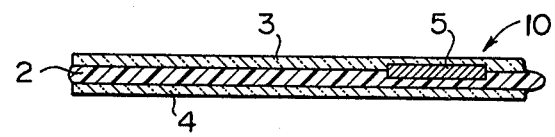
FIG. 3 is a sectional view showing the plastic card made from the plastic sheets shown in FIG. 2.

FIGS. 2 and 3 show an example of a plastic sheet assembly and a plastic card made therefrom in accordance with the method of the present invention. Referring to FIG. 2, a central thermoplastic sheet 2 is interposed between a front transparent plastic cover sheet 3 and a back transparent sheet 4. An identification member 5 such as a portrait is interposed between the cover sheet 3 and the central sheet 2. In this example, the back surface 3a of the cover sheet 3 and the back (inside) surface 4a of the back sheet 4 are provided with printed information. By subjecting the plastic sheet assembly 1 as shown in FIG. 2 to the pressure and high-frequency dielectric heating by the card laminating apparatus as shown in FIG. 1, a laminated plastic card 10 as shown in FIG. 3 is obtained. As shown in FIG. 3, the central sheet 2 is most deformed and the identification member 5 is buried in the central sheet 2. A part of the marginal portion of the central sheet 2 is pushed out from the edge of the front and back sheets 3 and 4. Since the printed information is provided on the surface of the front and back sheets 3 and 4, i.e. not on the central sheet 2 which is deformed, the printed information is not deformed.

Figure 4:
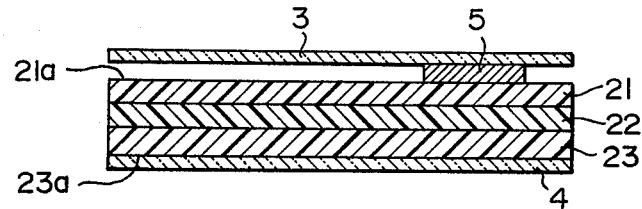
FIG. 4 is a sectional view showing another example of the plastic sheets to be made into a plastic card by the method of this invention.
Figure 5:
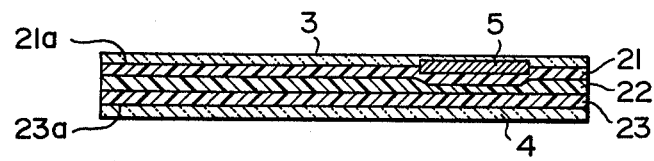
FIG. 5 is a sectional view showing a plastic card made from the plastic sheets shown in FIG. 4.

FIGS. 4 and 5 show another example in which three thermoplastic sheets 21, 22 and 23 are interposed between front and back transparent cover sheets 3 and 4. The numeral 5 indicates an identification member such as a portrait or the like. The reference numerals 3, 4 and 5 show the elements equivalent to those shown in FIGS. 2 and 3 with the same numerals. Among the three thermoplastic sheets 21, 22 and 23, the central sheet 22 is made of a material which is more easily softened by high-frequency dielectric heating than the other two sheets 21 and 23 so that the central sheet 22 is softened earlier than the others. Printed information is provided on the front surface 21a of the upper sheet 21 and on the outer surface 23a of the lower sheet 23 so that the information is not deformed when the central sheet 22 is deformed by the dielectric heating.

The thermoplastic sheets 2, 21, 22, 23, 3 and 4 employed in the above examples are selected from various known thermoplastic resins such as polyvinylchloride, polyvinylidene chloride, acrylic resin, polyurethane, polycarbonate, nylon resin, ethylenevinyl acetate resin, cellulose acetate resin and so forth. Among these materials, polyvinyl chloride, polyvinylidene chloride, cellulose acetate, polyurethane and a blend of polyvinylchloride and vinylacetate are suitable for the plastic sheets for making the laminated plastic card made in accordance with the present invention. The softness of the material under the high-frequency dielectric heating is determined by the conditions of preparation thereof.

The thickness of the thermoplastic sheets is selected between 50 to 300 microns in case of the transparent sheet, and between 100 to 500 microns in case of the opaque or white sheet. The opaque sheet which is interposed between transparent sheets is usually made white. In order to make the plastic sheet white, various white pigments can be used such as titanium oxide, zinc white, white lead, lithopone, zinc oxide, antimony oxide, zircon oxide etc. Among these pigments, titanium oxide is most suitable.

As the identification member 5 interposed between the transparent cover sheet 3, any kind of photograph can be used such as a black-and-white photograph, color photograph, film, paper, electrophotograph, diazo image photograph etc. The thickness of the identification member 5 is preferred to be as small as possible. However, it is usually difficult to obtain a photograph of thinner than 80 microns. The usual photographic film has a thickness of 100 to 200 microns and photographic paper has a thickness of about 250 microns. In this invention, the photograph having this order of thickness can be laminated into the card without forming bubbles therearound. Not only the photograph, but also a magnetic sheet or metal sheet can be laminated together with the plastic sheets. The magnetic sheet or metal sheet may be used for opening an electromagnetic lock or operating an electromagnetic or electric switch. Preferably, these sheets should also be thinner than 250 microns.

The following are examples of the method of making the laminated plastic card in accordance with the present invention as described hereinabove.

EXAMPLE I

A plastic sheet assembly of the type as shown in FIGS. 4 and 5 was employed. A white sheet of the thickness of 300 microns and the size of 10 × 12cm made of a blend of 60% of vinylchloride resin and 40% of vinylacetate resin was interposed between a pair of white hard vinylchloride resin sheets having a thickness of 200 microns and surface dimensions of 10 × 12cm. The latter sheets carried printed information on the outer surfaces. These sheets were interposed between a pair of transparent vinylchloride resin sheets having a thickness of 100 microns and surface dimensions of 10 × 12cm. Further, a 5 × 5cm color photograph having a thickness of 260 microns was interposed between the outer transparent sheet and the second sheet. This assembly was sandwiched between a pair of flat electrodes of a high-frequency dielectric heating device having a frequency of 40MHz and a power of 10kw. The assembly was subjected to pressure and high-frequency wave.

EXAMPLE II

A magnetic tape was added to the plastic sheet assembly employed in Example I. The resulted card had a thickness of 700 microns and had no bubbles and no deformed print information.

EXAMPLE III

A plastic sheet assembly of the type as shown in FIGS. 2 and 3 was employed. A thick white vinylidene chloride sheet having a thickness of 800 microns and surface dimensions of 20 × 20cm was interposed between a pair of transparent vinylchloride sheets of the same size and of the thickness of 50 microns. Further, in addition to this assembly as shown in FIG. 2, between the outer transparent sheet and the second sheet fifteen 5 × 5mm permanent magnets having a thickness of 250 microns were arranged in three parallel lines at equal intervals of 5mm. These sheets and magnets were laminated together under the same conditions as those of Example 1 except that the power was 10kw. The resulting card with magnets had a thickness of 750 microns.

EXAMPLE IV

A plastic sheet assembly as shown in FIGS. 2 and 3 was employed. The plastic sheet interposed between a pair of transparent cover sheets was a 10 × 12cm white vinylchloride resin sheet having a thickness of 500 microns. The cover sheets were transparent cellulose triacetate sheets having a thickness of 180 microns and the same size as that of the interposed sheet. A 4 × 4cm color photograph having a thickness of 250 microns coated with isocyanate group adhesives and having a roughened surface was interposed between the outer transparent sheet and the sheet interposed. The so prepared sheet assembly together with the photograph was subjected to the lamination process under the same conditions as those of Example VI. Thus, a card having a thickness of 650 microns without any bubbles was obtained.

We claim:

1. A method of making a laminated plastic card of a uniform thickness having an identification member interposed between layers thereof comprising the steps of:
   interposing at least one thermoplastic sheet between a pair of thermoplastic cover sheets, at least one of said pair of thermoplastic cover sheets being transparent,
   inserting an identification member having smaller surface dimensions than said sheets and smaller thickness than the total thickness of said sheets between said at least one transparent cover sheet and said sheet interposed between said cover sheets,
   sandwiching said sheets and member between a pair of flat electrodes of a high-frequency dielectric heating device,
   exerting a pressure uniformly on the sheets and member with said electrodes, and
   applying a high-frequency wave to the electrodes to heat the sheets and member from inside,
   said thermoplastic sheet interposed between the cover sheets being made of a material which is more easily softened by high-frequency dielectric heating than the material of which said cover sheets are made.

2. A method of making a laminated plastic card as defined in claim 1 wherein three thermoplastic sheets are interposed between a pair of thermoplastic cover sheets, and the central sheet interposed betweenthe other sheets of said three thermoplastic sheets is made of a material which is more easily softened by high-frequency dielectric heating than the material of which said the other sheets of said three thermoplastic sheets are made.

3. A method of making a laminated plastic card as defined in claim 2 wherein the outer surface of at least one of said other sheets is provided with printed information.

4. A method of making a laminated plastic card as defined in claim 1 wherein said identification member is a photograph having a thickness of not larger than 250 microns.

5. A method of making a laminated plastic card as defined in claim 4 wherein said photograph has surface irregularities.

6. A method of making a laminated plastic card as defined in claim 1 wherein the inside surface of at least one of said cover sheets is provided with printed information.

* * * * *